Nov. 21, 1967 — E. SHORT — 3,353,255
METHOD AND TOOLS FOR TIGHTENING SEALS
Filed Sept. 16, 1964 — 3 Sheets-Sheet 1
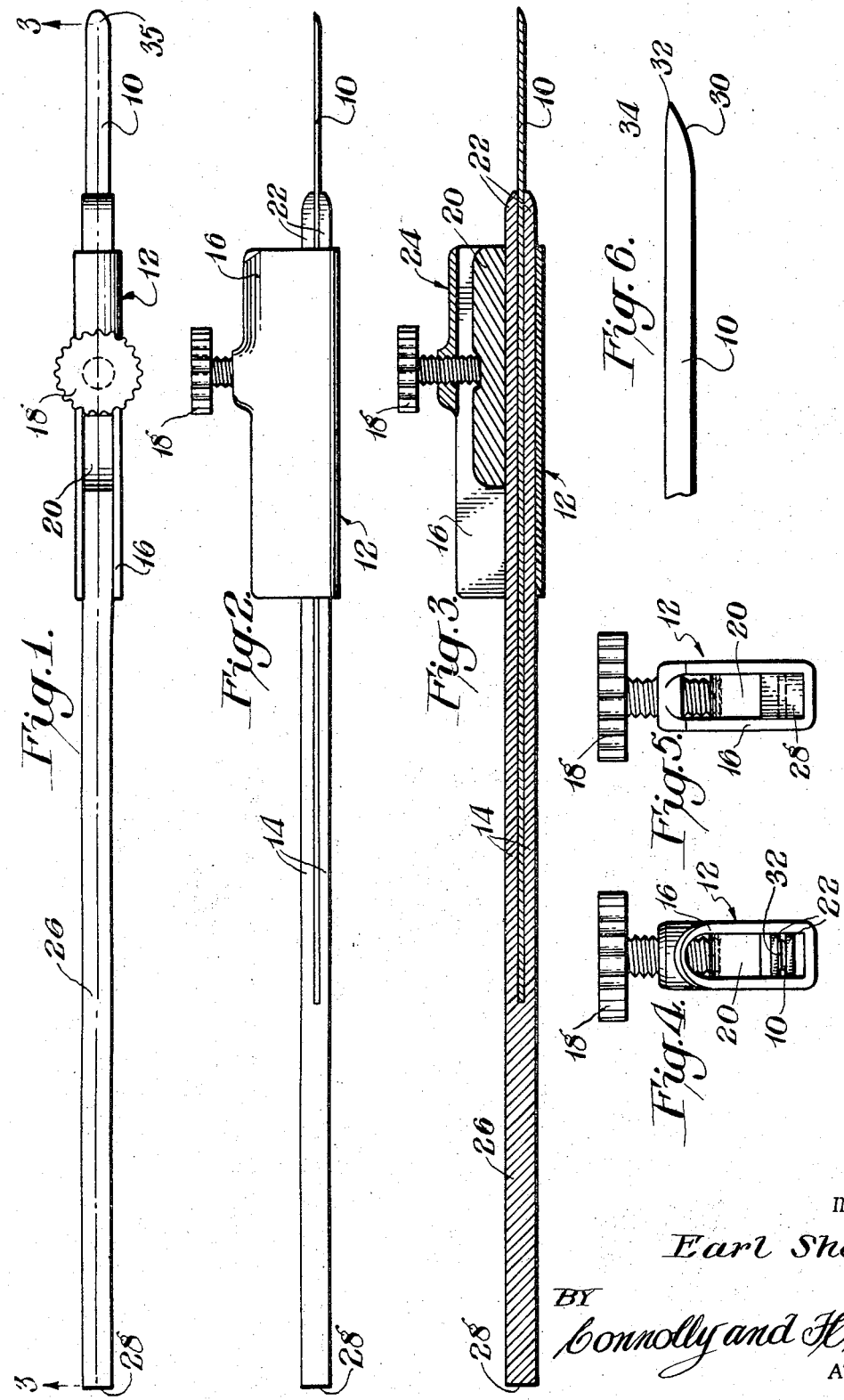
INVENTOR
Earl Short
BY Connolly and Hutz
ATTORNEYS

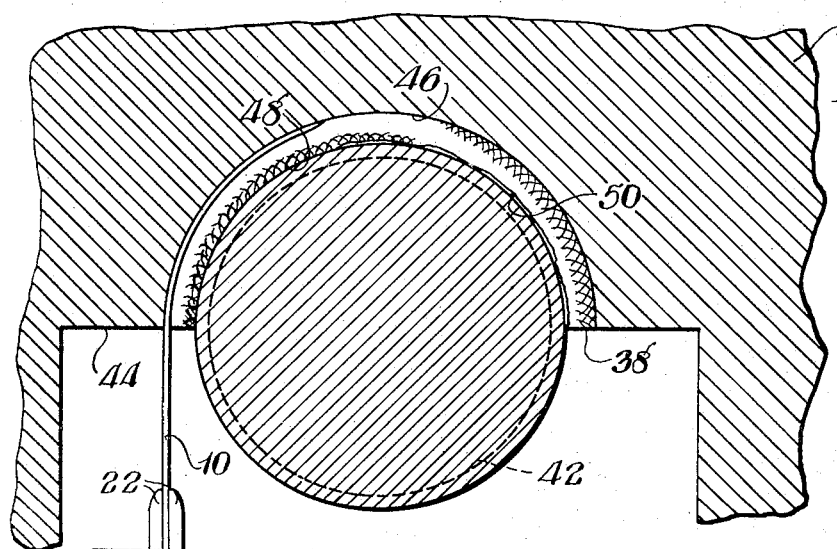
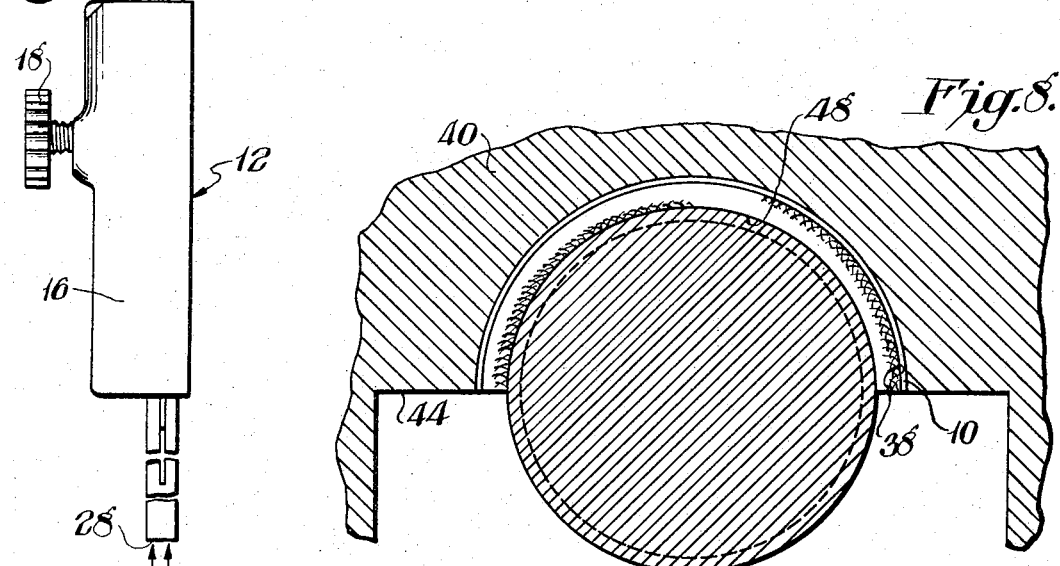
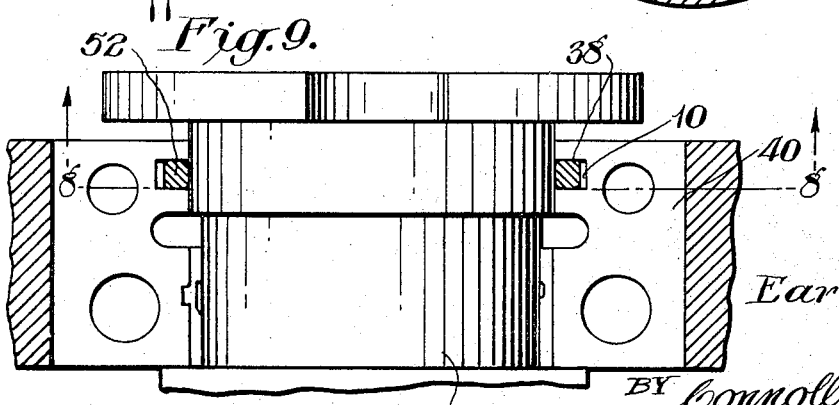

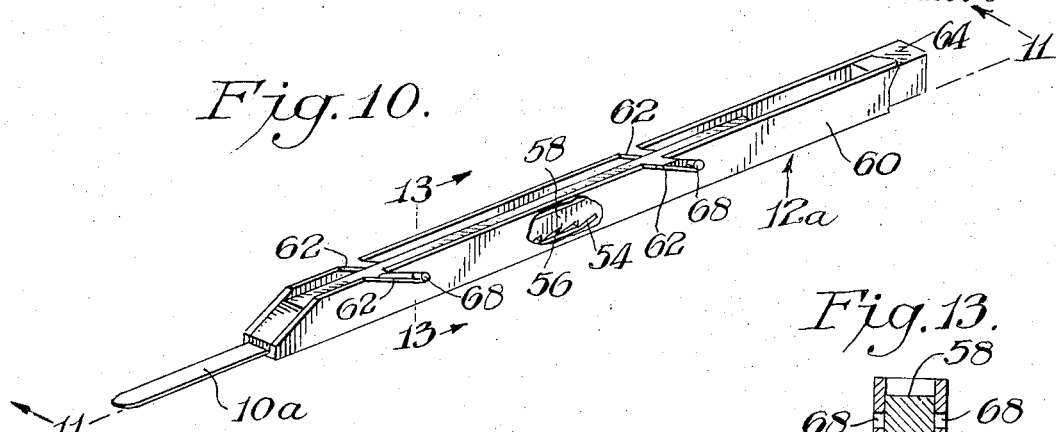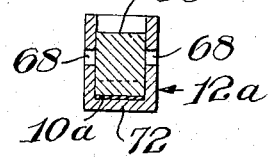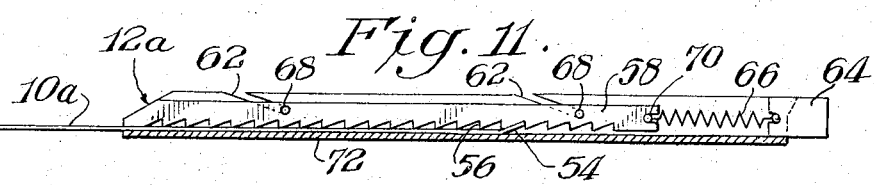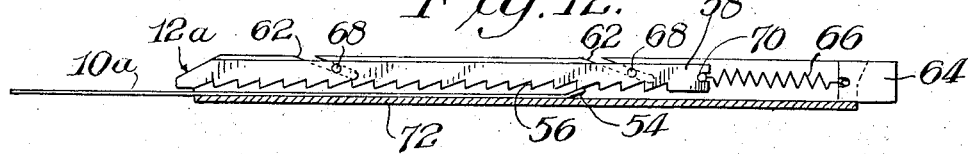

United States Patent Office 3,353,255
Patented Nov. 21, 1967

3,353,255
METHOD AND TOOLS FOR TIGHTENING SEALS
Earl Short, 2806 Faulkland Road,
Wilmington, Del. 19808
Filed Sept. 16, 1964, Ser. No. 398,152
7 Claims. (Cl. 29—401)

This application is a continuation-in-part of application Ser. No. 178,755, filed Mar. 9, 1962, now abandoned.

This invention relates to a method and tools for tightening a soft seal installed in a semicircular groove in a bearing block without removing the shaft from engagement with the block, and it more particularly relates to such a method and tools for tightening an oil seal in the upper rear main bearing block of an automobile or diesel engine without removing the crankshaft from engagement with the block.

It is a simple matter to renew the semicircular seal in the lower half of the rear main bearing block of an automobile engine because this block is easily disassembled and lowered away from the crankshaft where it can conveniently be worked upon. The substantially soft packing of flax or the like can accordingly easily be removed from the groove in the lower half of the block and renewed to tighten it. However access cannot be obtained to the upper half of the bearing block without going to the considerable trouble and expense of removing the crankshaft from engagement with the block and satisfying the subsequent problem of replacement of the crankshaft in proper alignment. One example of prior attempts of repairing a seal removing the shaft is shown in U.S. Patent No. 3,096,573.

An object of this invention is to provide a simple and economical method and tools for tightening a soft seal in a semicircular groove in a bearing block without the necessity of removing the shaft from engagement with the block.

Another object is to provide such a method and tools which are particularly well adapted for tightening a soft oil seal in the upper rear main bearing block of an automobile or diesel engine without the necessity of removing the crankshaft from engagement with the block.

In accordance with this invention a portion of a thin elongated strip of stiff flexible material is supported in a holder to prevent it from bending with the tip of the strip exposed from the holder. The tip is then placed at one of the ends of the semicircular groove in the bearing block between the soft seal and the back wall of the groove opposite from the shaft. The grasped holder is then moved toward the groove to insert the tip between the seal and the back wall. The holder is then manipulated to expose another portion of the strip and that portion is inserted into the groove. Other portions are subsequently exposed until the strip is completely inserted. The strip is of proper width and thickness to fit into close engagement between the back wall of the groove and the seal for urging the seal into tight sealing contact with the shaft. The seal is accordingly easily and rapidly tightened without the necessity of disassembling and reassembling the crankshaft in contrast to the hours formerly required to disassemble the crankshaft, renew the seal and reassemble the crankshaft.

A unique tool for expediting the passage of the shimming element about the groove includes a pair of fingers made of strong material which are clamped at one end about the elongated strip disposed between them with a portion of the strip extending outside of the fingers for introduction into the groove. The end of the tool remote from the extending strip forms a head which can be tapped to force the strip around the groove. Only a very short portion of the strip may be extended between the end of the fingers and the face of the groove during each forcing increment to minimize any danger of breaking the strip as it is forced around the groove.

In another form of this invention the tool for inserting the strip or shim includes a housing having a shim support with the shim positioned between the floor of the housing and the shim support. One end of the shim may be bent or inclined and may fit between teeth of the ratchet-like surface of the shim support. Accordingly, when the drive end of the tool is tapped, the shim cannot slide between the support and the housing floor and is thereby driven into the groove. To expose another portion of the shim, the tool is moved back and the bent end of the shim simply slides over the desired number of ratchet teeth.

Novel features and advantages of the present invention will become apparent to one skilled in the art from a reading of the following description in conjunction with the accompanying drawings wherein similar reference characters refer to similar parts and in which:

FIG. 1 is a plan view of one embodiment of the tool of this invention;

FIG. 2 is a view in elevation of the tool shown in FIG. 1;

FIG. 3 is a cross-sectional view taken through FIG. 1 along the line 3—3;

FIG. 4 is a right end view of the tool shown in FIG. 2;

FIG. 5 is a left end view of the tool shown in FIG. 2;

FIG. 6 is an enlarged side view in elevation of the extending end of the strip shown in FIG. 2;

FIG. 7 is a schematic view in elevation partially in cross section of the tool shown in FIGS. 1–6 being used to force the strip shown therein around a semicircular bearing groove for tightening the soft seal within it;

FIG. 8 is a view similar to FIG. 7 of the bearing after the strip has been completely forced around its periphery;

FIG. 9 is a plan view looking at the face of the bearing block shown in FIGS. 7 and 8 after the strip has been completely forced around it to tighten the seal; and FIG. 10 is a plan view of another embodiment of this invention;

FIG. 11 is a cross-sectional view in elevation taken through FIG. 10 along the line 11—11;

FIG. 12 is a cross-sectional view in elevation similar to FIG. 11 showing a different phase of operation; and FIG. 13 is a cross-sectional view in elevation taken through FIG. 10 along the line 13—13.

In FIGS. 1–6 is shown an elongated thin strip 10 of a stiff flexible material, such as spring steel, secured within a tool 12 which is used for forcing strip 10 around the periphery of a semicircular bearing groove for tightening a seal within it in a manner later described. Strip 10 is fairly narrow such as 3/16 or 3/32 inch wide and approximately 1/32 of an inch thick. Its thickness may also be conveniently expressed in decimal figures such as 0.030 inch thick. Tool 12 includes a pair of elongated fingers 14 inserted within a hollow casing 16 which together with set screw 18 and elongated shoe 20 forms a clamp for securing the end of strip 10 within the ends 22 of fingers 14 extending a short distance from clamp 24 formed by casing 16 and set screw 18. The ends of fingers 14 remote from clamp 24 are joined in a common rod 26 having a head 28 which may be tapped to force strip 10 around the groove in a manner later described.

As shown in FIG. 6, one side 30 of the tip 32 of strip 10 is appreciably tapered; and the other side 34 of tip 32 is also slightly tapered. Appreciably tapered side 30 is introduced next to the soft seal to facilitate its entry and passage between the seal and back wall, and slightly tapered side 34 is introduced next to the back wall of the seal groove to prevent it from snagging upon it during its passage around it as is later described. Both of these tapered sides 30 and 34 as well as the plan shape 35 of tip 32 shown in FIG. 1 are also slightly rounded to facilitate the passage of tip 32 about the groove between the back wall of the groove and the seal in it.

In FIG. 7 is shown tool 12 formed by fingers 14 and clamp 32 being used to force strip 10 about the periphery of semicircular groove 38 in bearing block 40, which is for example the upper rear main bearing block of an automobile engine. Crankshaft 42 is installed in engagement with bearing block 40. The force for driving strip 10 about bearing groove 38 is applied by tapping upon the head 28 of tool 36 with a hammer. Only a short length of strip 10 extending between the ends 22 of fingers 14 and the face 44 of bearing block 40 is released at one time to minimize the danger of snapping strip 10 as it is gradually tapped about the bearing between the soft seal 52 and rear wall of groove 38. The portion 48 of the interface between the soft seal and crankshaft 42 adjacent the portion of the circumference where strip 10 has been inserted is accordingly tightened to provide a satisfactory seal, whereas portion 50 of the same interface is loose from wear, and does not tighten until strip 10 is completely forced around the entire periphery of groove 38 as shown in FIG. 8. It is also possible to force strip 10 around by merely tapping upon its end without the use of tool 12, but tool 12 greatly expedites this process and minimizes any danger of snapping strip 10 in the process.

FIG. 9 illustrates how the introduction of strip 10 into bearing groove 38 fully renews or tightens soft seal 52 without a necessity of removing crankshaft 42 from engagement with bearing block 40. It is possible to utilize a strip 10 longer than the periphery of the groove and to break off the end remaining outside of the groove when the strip 10 is completely inserted. However by means of holder 12 a strip just exactly the length of the periphery may be forced completely into the groove to avoid any necessity of breaking off and smoothing any jagged edges.

FIGS. 10–13 show another embodiment of this invention. In this embodiment strip 10a is identical to strip 10 except that one end 54 is bent or inclined to cooperate with ratchet teeth 56 of shim support 58 in tool 12a in a manner later described in detail. Tool 12a includes a channel shaped housing 60 having slots 62 in its sides and opened at both ends. Drive block 64 is inserted in one end of housing 60 and is connected to shim support 58, for example, by spring 66 as shown in FIG. 11. Shim support 58 includes studs 68 which are inserted in slots 62 of housing 60 and stud 70 for receiving an end of spring 66. To assemble the device, studs 68 of shim support 58 are positioned in slots 62 as shown in FIG. 12 with the ratchet surface 56 spaced slightly from web or floor 72 to permit shim 10a to be slid upon web 72 until only the tip portion of the shim is exposed from tool 12a as shown in FIGS. 10–11. Shim support 58 is then released and inclined end 54 of shim 10a is engaged by ratchet teeth 56. Spring 66 maintains shim support 58 in this operative position shown in FIG. 11.

In use only the tip portion of strip 10a is exposed from tool 12a. This tip portion is then positioned with respect to seal groove 38 in a manner similar to strip 10 as shown in FIG. 7. Drive block 64 is then slightly tapped until the tip portion of strip 10a is between the back wall of the groove and the seal. Tool 10a is then moved slightly away from the groove so that inclined end 54 of strip 10a slides over ratchet teeth 56 until a sufficient amount of shim or strip 10a is further exposed. Drive block 64 is again tapped to force this other portion of strip 10a between the back wall and the seal. This process is repeated until the shim is completely around the groove.

As is readily apparent tools 12 and 12a can be manipulated to expose only the desired amount of strip 10 or 10a. Consequently, since only small portions of shims or strips 10 and 10a are exposed at one time the danger of the strip bending or breaking is eliminated.

What is claimed is:

1. A method of tightening a soft seal installed in a semi-circular groove in a bearing block without removing the shaft from engagement with said block comprising the steps of supporting an elongated thin strip of stiff flexible material in a holder with one end of said strip being exposed a controlled distance from said tool holder, positioning said one end of said strip at one of the exposed ends of said groove between said soft seal and the back wall of the groove opposite from said shaft, moving said holder and supported portion of said strip toward said groove to insert said one end of said strip into said groove, manipulating said holder to expose a further controlled portion of said strip, moving said holder and supported portion of said strip toward said groove to insert said exposed portion of said strip into said groove, and repeating said steps of manipulating said holder to expose portions of said strip and moving said holder toward said groove until said strip is completely inserted about the periphery of said groove whereby the seal material is urged into tight sealing contact with said shaft.

2. A method as set forth in claim 1 wherein said strip is longer than said periphery of said groove and the end remaining after it is completely inserted about said periphery is broken off at the face of said block.

3. A method as set forth in claim 1 wherein said holder is moved toward said groove by tapping said holder.

4. A method as set forth in claim 1 wherein said holder includes a shim support having a ratchet edge, an end of said strip being against said ratchet edge, and said step of manipulating said holder including sliding said end of said strip over said ratchet edge.

5. A method as set forth in claim 1 wherein said holder includes a pair of fingers with said strip positioned therebetween and a clamp about one of said fingers for securing said fingers about said strip, and said step of manipulating said holder includes untightening said clamp, moving said holder a short distance away from said groove to expose another portion of said strip, and re-tightening said clamp to secure said strip between said fingers.

6. A holder for forcing an elongated thin strip of stiff flexible material between a soft seal in a semicircular groove in a bearing block and the back wall of said groove to tighten the seal without removing the shaft from engagement with said block comprising a housing, a shim support in said housing, a ratchet surface on said shim support for causing said shim to move in only one direction, said ratchet surface being spaced from the floor of said housing a sufficient distance to permit said shim to be inserted therebetween, said housing being channel shaped and closed at one end, removable means connecting said shim support to said housing, said removable means comprising a pair of slots in the walls of said housing, lugs on said shim support slidably mounted in said slots, and said slots being inclined with respect to the plane of said floor of said housing.

7. A holder as set forth in claim 6 including resilient means between said shim support and said closed end urging said shim support toward said floor of said housing and toward said closed end.

References Cited

UNITED STATES PATENTS

| | | | |
|---|---|---|---|
| 403,254 | 5/1889 | Doddridge | 24—171 |
| 1,148,624 | 8/1915 | Randel | 277—237 |
| 1,880,431 | 10/1932 | Goodall | 254—134.3 |
| 2,564,095 | 8/1951 | Buckius | 277—237 |
| 2,988,939 | 6/1961 | Schiller | 81—3 |
| 2,990,734 | 7/1961 | Jackson | 81—3 |
| 3,007,723 | 11/1961 | Clarke | 277—1 |
| 3,058,750 | 10/1962 | Taylor | 277—1 |
| 3,096,573 | 7/1963 | Connors et al. | 29—238 |

JAMES L. JONES, Jr., *Primary Examiner.*